United States Patent
Annamraju et al.

(10) Patent No.: US 10,367,867 B2
(45) Date of Patent: Jul. 30, 2019

(54) IN-BAND QUALITY DATA

(71) Applicant: Imagination Technologies Limited, Kings Langley (GB)

(72) Inventors: Venu Annamraju, Hyderabad (IN); Kamarthi Mallikarjuna, Hyderabad (IN)

(73) Assignee: Imagination Technologies Limited, Kings Langley (GB)

( * ) Notice: Subject to any disclaimer, the term of this patent is extended or adjusted under 35 U.S.C. 154(b) by 277 days.

(21) Appl. No.: 14/978,848

(22) Filed: Dec. 22, 2015

(65) Prior Publication Data

US 2016/0182587 A1    Jun. 23, 2016

(30) Foreign Application Priority Data

Dec. 23, 2014   (GB) .................................. 1423138.5

(51) Int. Cl.
*H04L 29/06* (2006.01)
*H04N 19/67* (2014.01)
*H04N 21/24* (2011.01)
*H04L 12/823* (2013.01)
*H04N 21/442* (2011.01)
*H04N 21/2381* (2011.01)
*H04N 21/6375* (2011.01)
*H04N 21/6437* (2011.01)

(52) U.S. Cl.
CPC .......... *H04L 65/4084* (2013.01); *H04L 47/32* (2013.01); *H04N 19/67* (2014.11); *H04N 21/2381* (2013.01); *H04N 21/2402* (2013.01); *H04N 21/44209* (2013.01); *H04N 21/6375* (2013.01); *H04N 21/6437* (2013.01)

(58) Field of Classification Search
CPC . H04L 65/4092; H04L 47/32; H04N 21/6437; H04N 21/6375; H04N 21/44209
See application file for complete search history.

(56) References Cited

U.S. PATENT DOCUMENTS

| 2005/0094557 A1 | 5/2005 | Chen et al. |
| 2007/0230564 A1 | 10/2007 | Chen et al. |
| 2008/0192646 A1* | 8/2008 | Song ................. H04N 21/6437 370/252 |
| 2008/0214176 A1 | 9/2008 | Amon et al. |
| 2010/0183033 A1 | 7/2010 | Hannuksela |

FOREIGN PATENT DOCUMENTS

| EP | 1555827 A2 | 7/2005 |
| EP | 1936868 A1 | 6/2008 |
| WO | 2007/080502 A2 | 7/2007 |
| WO | 2008/076125 A1 | 6/2008 |
| WO | 2013/162259 A1 | 10/2013 |

* cited by examiner

*Primary Examiner* — Nam T Tran

(74) *Attorney, Agent, or Firm* — Vorys, Sater, Seymour and Pease LLP; Vincent M DeLuca

(57) ABSTRACT

A method of transmitting data in a media stream in accordance with a media streaming protocol includes generating data of a first type associated with a first type identifier in accordance with the protocol, encapsulating the generated data in a data structure defined by the protocol, the data structure including a type identifier field for specifying a type of data contained within the data structure, setting the type identifier field to a second type identifier different than the first type identifier, forming a packet comprising the first data structure, and transmitting the packet in the media stream.

22 Claims, 5 Drawing Sheets

IN-BAND QUALITY DATA

BACKGROUND OF THE INVENTION

This invention relates to a method and device for transmitting media quality data in a media stream.

Real-time streaming of multimedia content over the Internet has become an increasingly common application in recent years. A wide range of multimedia applications, such as on-demand TV, live TV viewing, audio streaming, video conferencing, net meetings, video telephony, Voice over Internet Protocol (VoIP) and many others rely on end-to-end streaming solutions. Unlike a "downloaded" media file, which may be retrieved first in "non-real" time and played back later, streaming media applications require a media source to encode and to transmit a media signal over a network to a media receiver, which must decode and playback the media signal in real time.

Problems can arise when a media stream is transmitted across a network, such as the Internet. For example, a significant packet loss rate across the transmission network leads to the media stream received at a receiving device to be incomplete. Typically, an attempt may be made to recover the lost packets prior to the time the media in those packets is due to be played back. If a lost packet is not received or recovered, the playback quality of the media will be degraded.

In order to optimise playback quality of the media, the transmitting and receiving devices may exchange information about the quality of the media stream. For example, a receiving device may recover lost packets by determining which packets have been lost in the network and then sending a request to the transmitting device to retransmit those packets. In an another example, the transmitting device may utilise Forward Error Correction (FEC) techniques, in which some redundant data or packets are sent to the receiving device along with the media packets. FEC packets allow the receiving device to recover media packets that may have been lost. The FEC packets can be included in the media stream before it is known whether any packet losses have occurred at the receiving device and if any repairs are necessary. The number of FEC packets transmitted may be determined from packet loss information (e.g. a percentage packet loss) received from the receiving device.

It is desirable to optimise the quality of media played back at a receiving device. Thus it can be beneficial to efficiently exchange quality data in order to optimise a media stream.

SUMMARY OF THE INVENTION

According to a first aspect there is provided a method of transmitting data in a media stream, the media stream being in accordance with a media streaming protocol, the method comprising: generating data of a first type, the first type being associated with a first type identifier in accordance with the protocol; encapsulating the generated data in a data structure defined by the protocol, wherein the data structure comprises a type identifier field for specifying a type of data contained within the data structure; setting the type identifier field to a second type identifier, the second type identifier being different to the first type identifier; forming a packet comprising the data structure; and transmitting the packet in the media stream.

The generated data may be quality data.

The generated data may comprise one or more of: FEC data; feed-forward data; feedback data; retransmission data; and configuration parameters.

The method may further comprise: receiving a prior packet comprising a data structure having the second type identifier, wherein the data is generated in dependence on the received prior packet.

The method may further comprise: receiving a device identifier from a receiving device; determining a mode of operation of the receiving device in dependence on the received device identifier, wherein the type identifier is set in dependence on the determined mode of operation.

The method may further comprise receiving the transmitted packet at a receiving device, wherein: if the receiving device is operating in a first mode, the receiving device analyses the encapsulated data in dependence on the second type identifier; and if the receiving device is operating in a second mode, the receiving device discards the packet in dependence on second type identifier.

The second type identifier may not be associated with the first type of data in the protocol.

The second type identifier may be unspecified in the protocol.

The media streaming protocol may be an RTP (Real-time Transport Protocol).

The media streaming protocol may be in accordance with a RTP Payload Format for H.264 Video standard.

The second type identifier may be a Network Abstraction Layer (NAL) unit type field having a NAL unit type value of 0, 30 or 31. The first type identifier may be a Network Abstraction Layer (NAL) unit type field having a NAL unit type value that is different to the NAL unit type value of the second type identifier.

The generated data may comprise supplemental enhancement information, as defined in the protocol.

The generated data may comprise FEC data and the data structure may be an aggregation unit.

The generated data may comprise retransmission data and the data structure is a fragmentation unit.

According to a second aspect there is provided a data processing device for transmitting data in a media stream, the media stream being in accordance with a media streaming protocol, the device comprising: a controller configured to generate data of a first type, the first type being associated with a first type identifier in accordance with the protocol; an encapsulator configured to: encapsulate the generated data in a data structure defined by the protocol, wherein the data structure comprises a type identifier field for specifying a type of data contained within the data structure; and set the type identifier field to a second type identifier, the second type identifier being different to the first type identifier; a packetiser configured to form a packet comprising the data structure; and a transceiver configured to transmit the packet in the media stream.

The transceiver may be further configured to receive a prior packet comprising a data structure having the second type identifier, wherein the data is generated in dependence on the received prior packet.

According to a third aspect there is provided a data processing device for receiving a media stream, the media stream being in accordance with a media streaming protocol, the device comprising: a transceiver configured to receive a packet of the media stream, wherein the packet comprises a data structure defined by the protocol and wherein the data structure comprises: data of a first type, the first type being associated with a first type identifier in accordance with the protocol; and a type identifier field for specifying a type of data contained within the data structure, the type identifier field being set to a second type identifier, the second type identifier being different to the first type identifier; and a controller configured to: if the device is operating in a first mode, analyse the encapsulated data in dependence on the second type identifier; and if the device is operating in a second mode, discard the packet in dependence on second type identifier.

The data of the first type may be quality data.

The data of the first type may comprise one or more of: FEC data; feed-forward data; feedback data; retransmission data; and configuration parameters.

The second type identifier may not associated with the first type of data in the protocol.

The second type identifier may be unspecified in the protocol.

The media streaming protocol may be an RTP.

The media streaming protocol may be in accordance with a RTP Payload Format for H.264 Video standard.

The second type identifier may be a Network Abstraction Layer (NAL) unit type field having a NAL unit type value of 0, 30 or 31. The first type identifier may be a Network Abstraction Layer (NAL) unit type field having a NAL unit type value that is different to the NAL unit type value of the second type identifier.

The first type of data may be supplemental enhancement information, as defined in the protocol.

The data of the first type may comprise FEC data and the data structure is an aggregation unit.

The data of the first type may comprise retransmission data and the data structure is a fragmentation unit.

According to a fourth aspect there is provided machine readable code for generating the data processing device described above.

According to a fifth aspect there is provided a non-transitory computer readable storage medium having stored thereon computer readable instructions that, when executed at a computer system for generating a representation of a digital circuit from definitions of circuit elements and data defining rules for combining those circuit elements, cause the computer system to generate the data processing device described above.

According to a sixth aspect there is provided machine readable code for implementing the method described above.

According to a seventh aspect there is provided a machine readable non-transitory storage medium having encoded thereon machine readable code for implementing the method described above.

DESCRIPTION OF THE DRAWINGS

The present invention will now be described by way of example with reference to the accompanying drawings. In the drawings.

DETAILED DESCRIPTION OF THE DRAWINGS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The embodiments described herein describe a mechanism for exchanging quality data to optimise the quality for a media stream. In the examples below, the media stream is a video stream. However, the mechanism can be applied to other types of data streams, such as audio streams, that are transmitted over a network. Furthermore, other types of data other than quality data may be exchanged.

Figure 1:
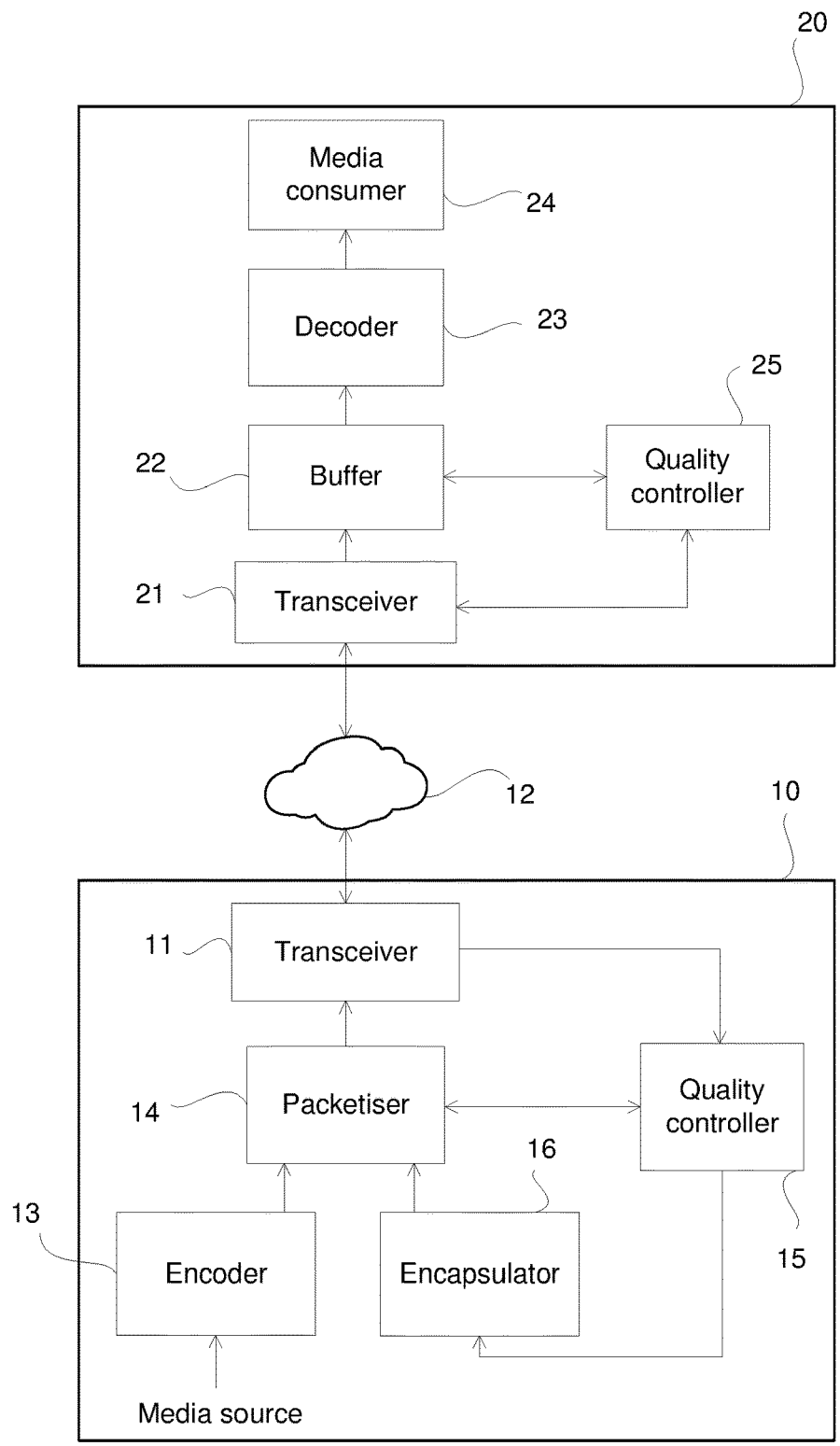
FIG. 1 shows an example of a transmitting device and a receiving device.

FIG. 1 depicts a transmitting device 10, which may be any suitable device that is capable of generating packet-based data such as a computer, smartphone, videophone, etc. The transmitting device 10 includes a transceiver 11 for connection to a communications network 12 such as the Internet or other packet based networks. The transmitting device 10 can transmit and/or receive packets to and/or from the communications network 12 via the transceiver 11.

The transmitting device 10 also includes an encoder 13 for encoding media data (e.g. video data) that is to be transmitted over the communications network 12 to a receiving device 20. The media data may be from a media source such as a camera and/or microphone (not shown). The encoder 13 may encode the media data according to a coding standard such as ITU-T Recommendation H.264 or ISO/IEC International Standard 14496-10 (both also known as Advanced Video Coding (AVC)). Any other suitable codecs may be used by the encoder 13.

The transmitting device 10 further includes a packetiser 14 which receives the encoded media from the encoder 13 and packetises it into a series of packets for transmission over the network 12 via the transceiver 11. The packetiser 14 may packetise the media in accordance with a Real-time Transport Protocol (RTP) standard. Other standardised packet formats may be used. Preferably, the encoder 13 and packetiser 14 operate in accordance with the Internet Engineering Task Force (IETF) RTP Payload Format for H.264 Video standard (also referred to as the "RTP video standard" herein). The packetiser 14 provides the packet stream to the transceiver 11 for transmission over the network 12 to receiving device 20.

The receiving device 20 includes a transceiver 21 for receiving the packet stream from the network 12. The packet stream is provided to a buffer 22, which may be a jitter buffer that is capable of ordering the packets according to a playback sequence of the media data in the packets. This sequence may be indicated by a sequence number contained in each packet. A decoder 23 decodes the packets in the order provided to it by the buffer 22 to form a media stream. The decoder 23 decodes packets according to the codec used by the encoder 13. A media consumer 24 receives the decoded media stream for playback. In the example shown in FIG. 1, the media consumer 24 may be an audio and/or video device, the data packets carrying media data may be RTP packets and the media stream may be video and/or audio.

As mentioned above, some transmitted packets may be lost by the network 12 and so those packets may not be received by the receiving device 20. This may lead to gaps in the sequence of data packets at the buffer 22 which may cause the playback of the media at the consumer 24 to degrade in quality, be delayed or stop. The packets lost may also include packets that are erroneous (due to errors caused by the network) that may be received at transceiver 21 but are not recoverable by transceiver 21. The network 12 may also cause some packets to be delayed and so those packets may not be received in a timely manner for real-time streaming.

It may be desirable for the receiving device 20 to send some feedback data to the transmitting device so that the transmitting device can transmit data to help improve the quality of the media played-back by the receiving device 20. However, the exchange of such data between the devices 10 and 20 might not be reliable or possible or timely under certain circumstances. For example, for a media stream transmitted in accordance with an RTP protocol, the following problems may exist when exchanging information between devices:

- RTP control protocol (RTCP) is a standard method of exchanging feedback parameters in a 2-way or multi-way call. However, due to the limited bandwidth for RTCP, certain data cannot be sent. For example, the RTCP bandwidth is not sufficient for sending FEC data. Furthermore, RTCP packets do not have redundancy or FEC and are sensitive to packet loss. As a consequence, RTCP is not a viable mechanism for exchanging quality or FEC data.
- Certain network elements in the path between the transmitting and receiving devices may not allow or support communication of certain information. For example, in session initiation protocol (SIP) based communications using session description protocol (SDP) for negotiation, proprietary codecs or out-of-band streams for the purpose of quality and FEC data must be explicitly negotiated between the transmitting and receiving devices 10 and 20. This can pose a problem in some applications using 3rd Generation Partnership Project (3GPP) networks, due to the presence of Session Border Controllers (SBCs) and/or SIP Back-to-Back User Agents (B2BUAs) in the call-setup and media paths. The SIP B2BUAs in 3GPP IP Multimedia Subsystem (IMS) framework disallow proprietary codec negotiation as well as out of-band streams that are not specified by 3GPP standards. Consequently, successful negotiation of proprietary codecs or out-of-band quality and FEC streams is unlikely. Without successful negotiation, SBCs may filter streams that have an un-negotiated payload type in the RTP header. Thus, exchange of quality and FEC data either as a proprietary codec or out-of-band stream might not be possible in all circumstances, even if both the end-points are capable of processing and transmitting such data.
- Multi-way conference bridges may not understand proprietary quality data exchanged between devices, which may lead to disruption in the transmission of the media stream and playback. In a 3GPP IMS infrastructure, a conference mixer may be inserted during a 2-way call without re-negotiation. Similarly, a mixer may be removed to resume the 2-way call without re-negotiation. This makes it challenging for end-points (that are successfully exchanging quality and FEC data through some means) to recognise such events and dynamically enable/disable exchange or quality or FEC data.

The above problems make it difficult to reliably transmit quality or FEC data between transmitting and receiving devices. This, in turn, can lead to a degradation in the quality of the media stream and, consequently, a degradation in the quality of the media that is played back. Furthermore, retransmission of lost packets using an RTP protocol can also be lost due to congestion or due to an unreliable network (e.g. a wireless link). Failed retransmissions and subsequent retransmission requests consume extra bandwidth and can become ineffective due to increased latencies. Described below is a method of exchanging data between devices in a way that avoids the problems mentioned above.

The transmitting device 10 includes a quality controller 15, which can receive information that is indicative of the quality of the media stream. The information received may be, for example, packet loss data, packet order loss data, re-transmission requests, Instantaneous Decoder Refresh (IDR) requests, a measure of available network bandwidth, a measure of network delay, and any other quality data. The quality information may generated and transmitted by the receiving device 20. The receiving device 20 also may include a quality controller 25 for generating quality data to be transmitted to the transmitting device 10. Quality controller 15 could also measure the quality of the network 12, for example, by directly testing the bandwidth and/or delay of the network 12.

From the quality information, the quality controller 15 may generate quality data to help improve the media quality at the receiving device 20. The quality data generated may be, for example, FEC data or packets, feed-forward data, re-transmission data that was originally generated at encoder 13, configuration parameters and any other data that is capable of optimising the playback of the media at the receiving device 20. Examples of feedback data include packet loss data (e.g. percentage packet loss), data which identifies lost packets, consecutive packet loss data, rate of receiving data, measures of network delay or congestion, jitter data, frame refresh data, etc. Examples of feed-forward data includes FEC span number, round trip time (RTT) or data for calculating the RTT, handshake information, acknowledgements, video quality requirements, number of frames, sequence number offset for a frame, timestamp offsets, padding offset for the last packet in a frame, data about the state of the transmitting device and its playback capabilities, etc. The FEC packets generated by the quality controller 15 may themselves contain feedback and/or feed-forward data as well as the FEC data.

The quality data generated by the quality controller 15 is encapsulated by an encapsulator 16. The encapsulator 16 is configured to encapsulate the quality data in data structures that may be similar to the data structures in which the encoded media data is encapsulated by encoder 13. For example, as mentioned above, encoder 13 and packetiser 14 may be configured to encode and packetise media data in accordance with the RTP video standard and uses certain data structures for sending the encoded media data. According the RTP video standard, the encoded video data and other data associated with the video data is encapsulated in a structure which forms the payload of an RTP packet. Each structure is associated with a Network Abstraction Layer (NAL) unit type, as shown in table 1.

TABLE 1

| NAL unit type | Structure | Structure name |
|---|---|---|
| 0 | Undefined | |
| 1-23 | NAL unit | Single NAL unit packet per H.264 |
| 24 | STAP-A | Single-time aggregation packet |
| 25 | STAP-B | Single-time aggregation packet |
| 26 | MTAP16 | Multi-time aggregation packet |

TABLE 1-continued

| NAL unit type | Structure | Structure name |
|---|---|---|
| 27 | MTAP24 | Multi-time aggregation packet |
| 28 | FU-A | Fragmentation unit |
| 29 | FU-B | Fragmentation unit |
| 30-31 | Undefined | |

Figure 2:
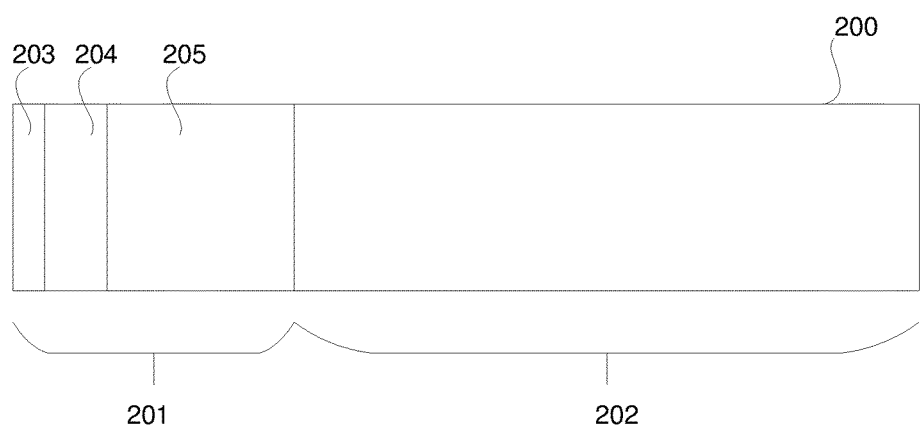
FIG. 2 shows the structure of a NAL unit.

The encoder 13 and packetiser 14 form a stream in accordance with the RTP video standard using the structures defined in Table 1 and the corresponding NAL unit type. As defined in the RTP video standard, each of the packets or units in table 1 comprise a field for specifying the NAL unit payload type. For example, FIG. 2 shows a diagram illustrating the structure of a single NAL unit 200, which comprises a header 201 and payload 202. The header 201 comprises a forbidden zero bit field 203, a NAL reference picture field 204 and a NAL unit type field 205. The NAL unit type field 205 specifies the type of data in the payload 202 of the NAL unit 200. Aggregation packets and fragmentation units also use headers that are similar to header 201. Table 2 identifies the payload data types for each NAL unit type value 1 to 23.

TABLE 2

| NAL unit type | Content of NAL unit |
|---|---|
| 1 | Coded slice of a non-IDR picture |
| 2 | Coded slice data partition A |
| 3 | Coded slice data partition B |
| 4 | Coded slice data partition C |
| 5 | Coded slice of an IDR picture |
| 6 | Supplemental enhancement information (SEI) |
| 7 | Sequence parameter set |
| 8 | Picture parameter set |
| 9 | Access unit delimiter |
| 10 | End of sequence |
| 11 | End of stream |
| 12 | Filler data |
| 13 | Sequence parameter set extension |
| 14 | Prefix NAL unit |
| 15 | Subset sequence parameter set |
| 16-18 | Reserved |
| 19 | Coded slice of an auxiliary coded picture without partitioning |
| 20 | Coded slice extension |
| 21-23 | Reserved |

For example, if the encoded video data is a coded slice of an IDR picture then, in accordance with the standard, the NAL unit type is 5 and so a single NAL unit packet is formed and the NAL unit type field is set to 5. The NAL unit then forms the payload of an RTP packet.

As mentioned above, it can be advantageous to exchange quality data between the transmitting and receiving devices 10 and 20. The above mentioned problems associated with exchanging quality data can be avoided by encapsulating the data in data structures defined by the RTP video standard and setting the NAL type field of those structure to one of the undefined (or unspecified) NAL unit type values (0, 30 or 31). For example, NAL unit type values of 0, 30 or 31 may be used.

For example, the quality controller 15 may determine that sending FEC data or packets may improve the quality of the video at the receiving device 20. However, as mentioned above, there may be problems associated with sending such FEC packets. Thus, the FEC packets are sent by the quality controller 15 to the encapsulator 16, which encapsulates the FEC packets in a data structure and sets the NAL type field in that structure to 0, 30 or 31. Preferably, the FEC packets are encapsulated in an aggregation unit, which may be aggregated with other aggregation units to form an aggregation packet (such as STAP-A, STAP-B, MTAP16 and MTAP24). As defined in the RTP video standard, an aggregation packet may comprise multiple aggregation units. An aggregation unit comprises a NAL unit (as described in FIG. 2), which comprises a NAL unit type field for specifying the type of data in the payload of the NAL unit. The type field of the NAL unit is set to 0, 30 or 31.

Figure 3:
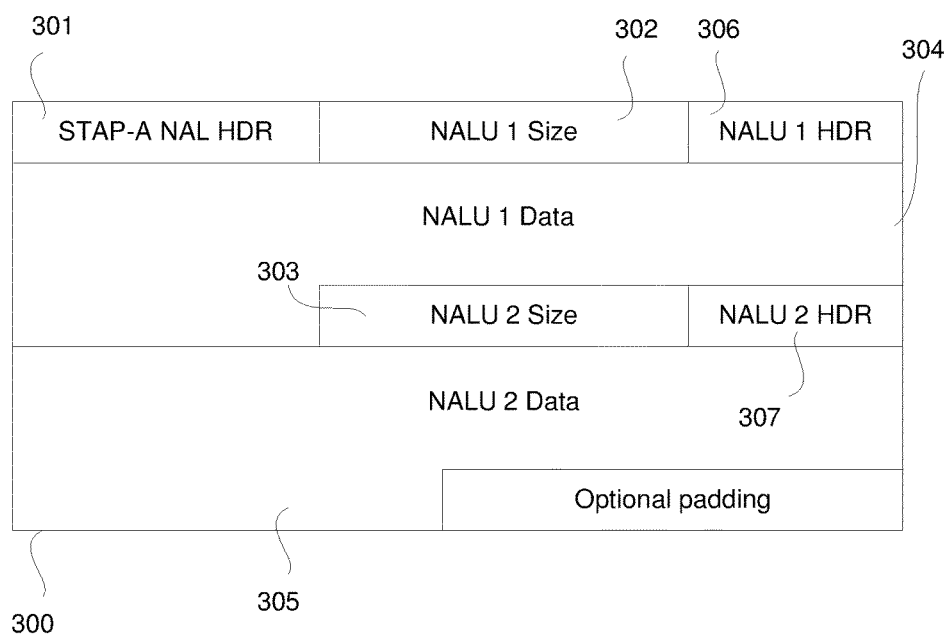
FIG. 3 shows the format of a STAP-A aggregation packet.

Preferably, FEC packets are sent in STAP-A packets 300 (with a NAL type field 301 set to 24, in accordance with the standard), as shown in FIG. 3. Within a STAP-A packet are multiple aggregation units. FIG. 3 shows a STAP-A packet 300 with two aggregation units. Each aggregation unit has a size field 302 and 303, which is set equal to the size of the NAL unit header size+quality data (if any) size+FEC data size. Within each aggregation unit is a NAL unit. The FEC data is encapsulated by the payload 304 and 305 of the NAL unit and the NAL unit type in the header 306 and 307 of the NAL unit is set to 0, 30 or 31, which indicates that a non-standard NAL payload is present. Receivers capable of processing the payload will interpret this as quality and FEC data and process accordingly. All other receivers will discard this NAL unit during de-packetisation as those receivers may not be configured to process NAL units with a NAL unit type of 0, 30 or 31.

In another example, retransmission of packets can be problematic, as mentioned above. In this case, retransmission packets are generated by the quality controller 15. Each retransmission packet is sent to the encapsulator 16, which encapsulates the retransmission packet in a data structure. Preferably, a retransmission packet (which includes the RTP header) may be fragmented into two or more fragments when the size of packet to be retransmitted exceeds the packetisation size of the current FEC span, each fragment being encapsulated in a fragmentation unit. One or more such fragmented retransmitted packets are appended to the end of the current frame and treated as input data to be protected by FEC encoding.

Figure 4:
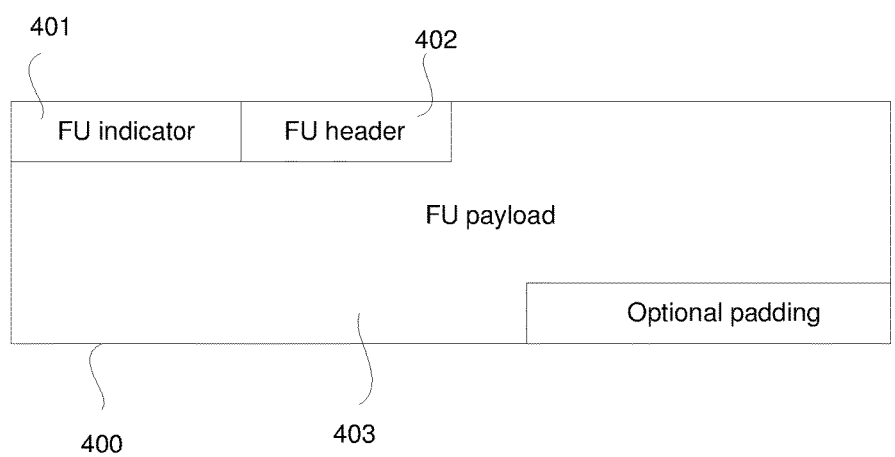
FIG. 4 shows the format of a FU-A fragmentation unit.

In accordance with the FU-A format 400, as shown in FIG. 4, the type field in FU indicator 401 is set to 28. The type field in FU header 402, however, is set to 0, 30 or 31. This serves to indicate to compatible devices that the payload 403 is a retransmitted packet or its fragment. Preferably, retransmission packets are encapsulated in FU-A units with the NAL type field set to 31, but could also be set to 0 or 30. Compatible receivers capable of processing in-band and quality data will interpret this fragmentation NAL unit as a retransmitted packet fragment and process accordingly. Receivers not capable of processing the quality data will discard the NAL unit during de-packetisation as those receivers may not be configured to process NAL units with a NAL unit type of 0, 30 or 31.

In yet another example, quality data generated by the quality controller 15 may be encapsulated by the encapsulator 16 in a single NAL unit packet structure, with or without FEC data. The single NAL unit packet comprises a field for specifying the NAL type, which is set to 0, 30 or 31.

The above examples of encapsulating data such as FEC data, retransmission data and other quality data in one of the standard data structures and setting the NAL type field to 0, 30 or 31 provides for a low overhead mechanism of exchanging quality data. The RTP video standard mandates that such data is usually sent as SEI data, which has a NAL type of 6 and specifies that certain additional data (such as user IDs) is included in the NAL unit. Including that additional data increases the overhead in sending the quality data. Furthermore, the standard mandates that the SEI data must precede video coding layer (VCL) data. However, by sending the quality data in a data structure with an undefined NAL type (e.g. a NAL type of 0, 30 or 31) instead of sending that data as SEI data with a NAL type of 6, the quality data is sent with a lower overhead and it can be sent whenever it is required (rather than preceding VCL data).

The quality data encapsulated by the encapsulator 16 is then sent to the packetiser 14, which forms an RTP packet having the encapsulated quality data as its payload. The packetiser also forms RTP packets from the media from encoder 13 and forms a single packet stream from both the media packets and the quality packets. Thus, the quality data is sent in-band with the media data. The packet stream is then provided to the transceiver 11 for transmission over the network 12 to the receiving device 20.

Figure 5:
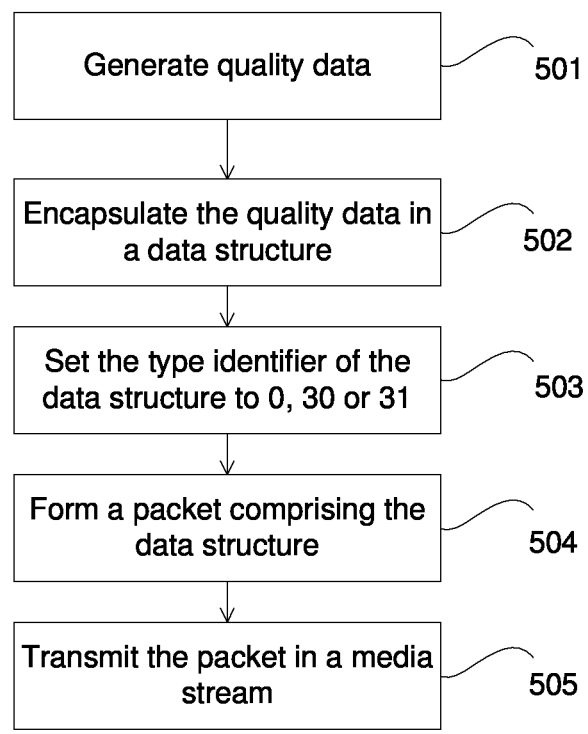
FIG. 5 shows a flow diagram for transmitting quality data in a media stream.

FIG. 5 shows a flow diagram for transmitting quality data in a media stream transmitted in accordance with the RTP video standard. At step 501, quality data (e.g. FEC packets, retransmitted packets, configuration data, missing packet data, etc) is generated. At step 502, the quality data is encapsulated in a data structure (e.g. a NAL unit, as described above). At step 503, the type identifier field (e.g. NAL type field) of the data structure is set to 0, 30 or 31. At step 504, a packet (e.g. RTP packet) is formed that includes the data structure as its payload. At step 505, the formed packet is added to the media stream for transmission.

The receiving device 20 may be capable of operating in accordance with the RTP video standard. The receiving device 20 may be a device that is capable of exchanging quality data with the transmitting device 10. The receiving device 20 may include a quality controller 25 and is capable of receiving and generating quality data (similarly to quality controller 15 of transmitting device 10). The receiving device 20 may be configured to identify received packets having data structures with a NAL type of 0, 30 or 31 and direct those packets (or those data structures) to the quality controller 25 for decoding or analysing of the data in those packets. Such decoding and analysis may be performed separately to the decoding of the standard encoded media data packets, which may be directed to the decoder 23. The quality controller 25 may determine the content of the quality data packets and perform further steps in dependence on the content. For example, if the content of a quality packet is FEC packets, then quality controller 25 may decode or recover media packets from the FEC packets and provide those media packets to the media decoder 23. If, for example, the content of quality packet is feed-forward data such as data indicating time the packet was generated, then the quality controller 25 may determine a measure of network delay. The network delay data may then be fed back to the transmitting device 10 by encapsulating the data in a data structure and setting the NAL type field of the data structure to 0, 30 or 31, as described above.

Alternatively, the receiving device may be a device that is not capable of exchanging the quality data. For example, such a device may have its quality controller disabled or be a third party device that does not comprise a quality controller and is only capable of operating in accordance with the RTP video standard. Such a device may be capable of receiving the packet stream comprising both media packets and quality packets with NAL type 0, 30 or 31. The receiving device is capable of decoding the packets containing the encoded media data, as those packets were formed in accordance with the RTP video standard. However for the quality packets containing data structures with a NAL type 0, 30 or 31, as such NAL types are undefined by the RTP video standard, the device may simply discard those packets without affecting the decoding and processing of the media packets sent in accordance with the protocol. Although such a receiving device is not capable analysing packets with a NAL type of 0, 30 or 31, it is still able to decode the media data in the stream and an inability to exchange quality data in this way does not hinder compatibility with receiving devices from different vendors as long as those devices are capable of operating according to the RTP video standard.

The quality controllers 15 and 25 of the transmitting and receiving devices 10 and 20 respectively are configured to determine whether or not a device it is transmitting to or receiving from is capable of exchanging quality data. This may be achieved, for example, during initial call negotiation between the devices. The determination may also be achieved by receiving any data structure with a NAL type of 0, 30 or 31, which causes the receiving device to determine that the transmitting device is capable of exchanging quality data as described above. In another example, the transmitting device may send a packet that is in accordance with the RTP video standard comprising the ID of the transmitting device, which may preferably be a unique user ID of the transmitting device. The receiving device may then use the received ID to determine if the transmitting device is capable of exchanging quality data, as described above. For example, the ID may be compared to list of IDs that are known to have the capability. If the received ID matches a listed ID, then the receiving device determines that the transmitting device has the quality data exchanging capability. The list may also indicate of the capabilities of the transmitting device.

In some situations, a direct two-way call between the transmitting and receiving devices 10 and 20 may sometimes switch over to a conference bridge when other parties are added to the call. The first frame the bridge will send to all parties following the switch will usually be an IDR frame. The bridge may not be capable of receiving or processing data structures with a NAL type of 0, 30 or 31 or of processing the unique ID. Thus the transmitting and receiving devices 10 and 20 will not receive those packets with the IDR frame. The quality controllers 15 and 25 may be configured to cause devices 10 and 20 to disable their quality data exchange capabilities in such a situation. If the added parties then leave the call and the call returns to a direct two-way call, devices the controllers 15 and 25 may then re-enable their quality data exchange capabilities.

As mentioned above, the transmitting device 10 may retransmit some packets. The transmitting device 10 may determine which packets need to be retransmitted by receiving an indication of which packets were lost in the network from the receiving device 20. Each packet in the stream sent by the transmitting device 10 may comprise a sequence number. The receiving device 20 may determine which packets are lost in the network by determining which sequence numbers are missing from the received packet stream. The receiving device 20 may then send an indication of which packets are missing to the transmitting device 10. For example, the missing packets may be indicated by a sequence of 1s and 0s. Each position in the sequence of 1s and 0s may correspond to a sequence number in the packet stream. A "1" may indicate that a packet having the corresponding sequence number has been received and a "0" may indicate that a packet having the corresponding sequence number is missing, or vice versa. This sequence of 1s and 0s may be sent as part of the quality data exchange as described above, e.g. from the quality controller 25 to quality controller 15. From the indication of lost packets, the quality controller 15 may generate some or all of the lost packets, which are then encapsulated in a data structure with a NAL type 0, 30 or 31, e.g. using one or more FU-A structures with NAL type 31. The missing packets may be media packets and/or the quality packets, which may comprise FEC packets. The quality controller 15 may prioritise retransmitting packets that will maintain the quality of the media played back that the receiving device, such as media packets or quality packets containing FEC packets.

The retransmitted packets themselves may be protected against further loss by also generating and sending FEC packets for those retransmitted packets. If the retransmitted packets are not received by the receiving device 20, then the receiving device 20 may again indicate to the transmitting device 10 that those packets have not been received so that they are retransmitted again.

As mentioned above, there are some scenarios where the exchange of quality data may not be possible via network 12. However, by encapsulating the quality data in the data structures and setting the NAL type field to 0, 30 or 31, the quality data is able to be received by the receiving device 20. For example, network elements such as SBCs and B2BUAs may not provide support for the transmission of proprietary quality data. However, by encapsulating the unsupported quality data in a data structure that is supported by those network elements, the quality data is capable of being transmitted through the network 12 and to the receiving device 20.

There are a number of other advantages associated with encapsulating quality data in a data structure defined by the RTP video standard and setting the NAL type field to a value of 0, 30 or 31, which is not in accordance with the standard. Such advantages include:

Being able to send feedback, feed-forward data with a lower overhead. As mentioned above, there is limited bandwidth available when using RTCP to send periodic feed-forward and feedback data. The method of exchanging quality data described herein does not suffer from such a limitation. The feed-forward and feedback data quality data is preferably combined with FEC data as one packet thus minimising the IP overhead as compared to sending them in separate packets. Furthermore, as the quality data is sent in RTP packets, there is no bandwidth limitation imposed, as is the case for RTCP packets.

Increased reliability in sending feed-forward and feedback data. For an FEC span, the feedback and feed-forward data may be combined with FEC packets. Thus the feed-forward and feedback data is accorded with a similar loss-resiliency as video data and adapts to network conditions similarly to the video data.

Independence from negotiation constraints and increased reliability in sending quality data. As mentioned above, out-of-band streams may not be supported in certain cases. By sending the quality data in-band, the risk of failure of an out-of-band stream is negated.

Preserved interoperability with conferencing bridges. As mentioned above, multi-way conference bridges may not be compatible with proprietary quality data. However, by encapsulating the quality data in a data structure that is defined in a standard, which the bridge would be compatible with, the devices are still able to send media data via the bridge while the quality data packets (which have data structures with a NAL type of 0, 30 or 31) may simply be discarded by the bridge. Thus the media stream to the receiving devices is maintained even though the quality packets are discarded.

Interoperability with third-party devices. As mentioned above, third-party devices that are compatible with the RTP video standard may still receive the stream and playback the media even though they may also discard the packets with a NAL type of 0, 30 or 31. Thus sending the packets with a NAL type of 0, 30 or 31 will not have a detrimental effect on third party devices such as conference mixers, bridges and end-points. Furthermore, the quality controller of a device can determine if the device it is communicating with is capable of exchanging quality data (e.g., from its unique ID). The quality controller is capable of dynamically enabling and disabling the transmission of quality data depending on the capabilities of the other device. This prevents unnecessary quality data from being transmitted and so there is greater bandwidth available for video data.

Lower overhead than sending quality data in accordance with the standard. In some cases, it is possible to send quality data in accordance with the RTP video standard by sending it as SEI data, which would be encapsulated in a NAL unit with an NAL unit type of 6 (see Table 2). However, in accordance with the RTP video standard, sending SEI data would require some additional information to be included in the packet such as the user ID of the sending and/or receiving device. Thus there is an additional overhead when sending SEI data in accordance with the standard. However, by sending the data in one of the data structures and setting the NAL type to 0, 30 or 31, the user ID is not be required. Thus, there is a lower overhead in sending the quality data in a data structure with a NAL type 0, 30 or 31 instead of sending the data in accordance with the standard.

Loss-resilient packet retransmission. By including retransmitted packets along with data packets for FEC encoding in a FEC span, retransmitted packets have higher probability of being received at the other end. Through feedback of the number of lost packets for each FEC span and knowledge of FEC packets that were transmitted in that span, it is possible to recover all the missing packets by reliably retransmitting just enough packets to aid FEC recovery. This has the advantage of reducing retransmission bandwidth over conventional retransmission without FEC protection.

The transmitting and receiving devices configured in accordance with the examples described herein could be embodied in hardware, software or any suitable combination of hardware and software. The transmitting devices may have the same capabilities as the receiving devices and vice versa. The devices as described herein could comprise, for example, software for execution at one or more processors (such as at a CPU and/or GPU), and/or one or more dedicated processors (such as ASICs), and/or one or more programmable processors (such as FPGAs) suitably programmed so as to provide functionalities of the devices, and/or heterogeneous processors comprising one or more dedicated, programmable and general purpose processing functionalities. The devices described herein can comprise one or more processors and one or more memories having program code stored thereon, the processors and the memories being such as to, in combination, provide the claimed devices and/or perform the claimed methods.

Data processing units described herein (e.g. encoder, quality controller and packetizer) need not be provided as discrete units and represent functionalities that could (a) be combined in any manner, and (b) themselves comprise one or more data processing entities. Data processing units could be provided by any suitable hardware or software functionalities, or combinations of hardware and software functionalities.

The term software as used herein includes executable code for processors (e.g. CPUs and/or GPUs), firmware, bytecode, programming language code such as C or OpenCL, and modules for reconfigurable logic devices such as FPGAs. Machine-readable code includes software and code for defining hardware, such as register transfer level (RTL) code as might be generated in Verilog or VHDL.

Any one or more of the methods described herein could be performed by one or more physical processing units executing program code that causes the unit(s) to perform the methods. The or each physical processing unit could be any suitable processor, such as a CPU or GPU (or a core thereof), or fixed function or programmable hardware. The program code could be stored in non-transitory form at a machine readable medium such as an integrated circuit memory, or optical or magnetic storage. A machine readable medium might comprise several memories, such as on-chip memories, computer working memories, and non-volatile storage devices.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method of transmitting data in a media stream to a receiving device, the media stream being in accordance with a media streaming protocol which defines a data structure comprising a type identifier field for specifying a type of data contained within the data structure, wherein the type identifier field is settable to a first type identifier or a second type identifier different from the first type identifier, the method comprising:
    determining whether or not the receiving device is capable of processing data in a data structure having the type identifier field set to the second type identifier, wherein if it is determined that the receiving device is capable of processing data in a data structure having the type identifier field set to the second type identifier, the method further comprising:
    generating data of a first type, the first type being associated with the first type identifier in accordance with said protocol;
    encapsulating the generated data in a data structure defined by said protocol;
    setting the type identifier field of the data structure to the second type identifier;
    forming a packet comprising the data structure; and
    transmitting the packet in the media stream.

2. A method as claimed in claim 1, wherein the generated data is quality data.

3. A method as claimed in claim 2, wherein the generated data comprises one or more of: FEC data; feed-forward data; feedback data; retransmission data; and configuration parameters.

4. A method as claimed in claim 1, wherein the method further comprises: receiving a prior packet comprising a data structure having the second type identifier, wherein the data is generated in dependence on the received prior packet.

5. A method as claimed in claim 1, wherein the method further comprises:
    receiving a device identifier from a receiving device; and
    determining a mode of operation of the receiving device in dependence on the received device identifier, wherein the type identifier is set in dependence on the determined mode of operation.

6. A method as claimed in claim 1, wherein the method further comprises receiving the transmitted packet at a receiving device, wherein:
    if the receiving device is operating in a first mode, the receiving device analyses the encapsulated data in dependence on the second type identifier; and
    if the receiving device is operating in a second mode, the receiving device discards the packet in dependence on second type identifier.

7. A method as claimed in claim 1, wherein the second type identifier is unspecified in the protocol.

8. A method as claimed in claim 1, wherein the media streaming protocol is in accordance with a RTP Payload Format for H.264 Video standard.

9. A method as claimed in claim 8, wherein the second type identifier is a Network Abstraction Layer (NAL) unit type field having a NAL unit type value of 0, 30 or 31.

10. A method as claimed in claim 8, wherein the generated data comprises supplemental enhancement information, as defined in the protocol.

11. A method as claimed in claim 1, wherein if it is determined that the receiving device is not capable of processing data in a data structure having the type identifier field set to the second type identifier, the transmission of quality data is disabled.

12. A data processing device configured to transmit data in a media stream to a receiving device, the media stream being in accordance with a media streaming protocol which defines a data structure comprising a type identifier field for specifying a type of data contained within the data structure, wherein the type identifier field is settable to a first type identifier or a second type identifier different from the first type identifier, the device comprising a controller, an encapsulator, a packetiser and a transceiver, wherein:
    the data processing device is configured to determine whether or not the receiving device is capable of processing data in a data structure having a type identifier set to the second type identifier;
    wherein if it is determined that the receiving device is capable of processing data in a data structure having the type identifier set to the second type identifier:
    the controller generates data of a first type, the first type being associated with the first type identifier in accordance with said protocol,
    the encapsulator:
        encapsulates the generated data in a data structure defined by the protocol, and
        sets the type identifier field to the second type identifier;
    the packetiser forms a packet comprising the data structure; and
    the transceiver transmits the packet in the media stream.

13. A device as claimed in claim 12, wherein the data of the first type is quality data.

14. A device as claimed in claim 13, wherein the data of the first type comprises one or more of: FEC data; feedforward data; feedback data; retransmission data; and configuration parameters.

15. A device as claimed in claim 12, wherein the second type identifier is not associated with the first type of data in the protocol.

16. A device as claimed in claim 12, wherein the second type identifier is unspecified in the protocol.

17. A device as claimed in claim 12, wherein the media streaming protocol is in accordance with a RTP Payload Format for H.264 Video standard.

18. A device as claimed in claim 17, wherein the second type identifier is a Network Abstraction Layer (NAL) unit type field having a NAL unit type value of 0, 30 or 31.

19. A device as claimed in claim 17, wherein the generated data comprises supplemental enhancement information, as defined in the protocol.

20. A device as claimed in claim 12, wherein if it is determined that the receiving device is not capable of processing data in a data structure having the type identifier field set to the second type identifier, the transmission of is quality data is disabled.

21. A device as claimed in claim 12, wherein the receiving device comprises a transceiver, the transceiver being configured to transmit a packet to the data processing device, the transmitted packet being capable of indicating whether or not the data processing device is capable of processing data in a data structure having the type identifier set to the second type identifier.

22. A device as claimed in claim 21, wherein the transceiver is further configured to receive a prior packet comprising a data structure having the second type identifier, wherein the data is generated in dependence on the received prior packet.

* * * * *